United States Patent
Magnusson et al.

(12) 
(10) Patent No.: US 6,193,884 B1
(45) Date of Patent: *Feb. 27, 2001

(54) DRIPLESS PURIFICATION MANIFOLD AND CARTRIDGE

(75) Inventors: Jan H. Magnusson, Mahtomedi; Alan Lonneman, Plymouth; David M. Botts, Minneapolis, all of MN (US)

(73) Assignee: PentaPure Incorporated, West St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/261,785

(22) Filed: Mar. 3, 1999

Related U.S. Application Data (60) Continuation of application No. 08/984,893, filed on Dec. 4, 1997, now Pat. No. 6,027,644, which is a division of application No. 08/695,134, filed on Aug. 8, 1996, now Pat. No. 5,753,107.

(51) Int. Cl.[7] .............................. B01D 27/07; B01D 35/30
(52) U.S. Cl. ......................... 210/235; 210/117; 210/418; 210/419; 210/420; 210/484; 210/DIG. 17
(58) Field of Search .................................... 210/232, 235, 210/236, 418–420, 473, 484, DIG. 17, 117

(56) References Cited

U.S. PATENT DOCUMENTS

| | | | |
|---|---|---|---|
| 5,215,655 | * | 6/1993 | Mittermaier ......................... 210/234 |
| 5,486,288 | * | 1/1996 | Stanford et al. ..................... 210/235 |
| 5,548,893 | * | 8/1996 | Koelfgen .......................... 29/888.011 |

* cited by examiner

*Primary Examiner*—Joseph W. Drodge
*Assistant Examiner*—Michael A. Fleming
(74) *Attorney, Agent, or Firm*—Patterson, Thuente, Skaar & Christensen, P.A.

(57) ABSTRACT

A cartridge based water purification and filtration system which permits cartridge changes without drainage at the input and output ports. Interlocking flanges at the manifold and cartridge lock the cartridge to the manifold and raised surfaces at the cartridge operate the inlet valve with a rotational seating of the cartridge. A spring biased inlet valve depends from a supply manifold input port and cooperates with the filter cartridge to prevent forward flow until the cartridge is seated to the manifold. The check valve includes a split stem which prevents chatter with valve operation. A check valve at the output port cooperates with a sealed bayonet fitting that mates to a concentric outlet port at the cartridge to prevent back flow with cartridge removal.

16 Claims, 7 Drawing Sheets

DRIPLESS PURIFICATION MANIFOLD AND CARTRIDGE

This is a Continuation of application Ser. No. 08/984,893 filed Dec. 4, 1997, now issued as U.S. Pat. No. 6,027,644 which in turn is a division of application Ser. No. 08/695,134, filed Aug. 8, 1996, now issued as U.S. Pat. No. 5,753,107, issued May 19, 1998.

BACKGROUND OF THE INVENTION

The present invention relates to water purification and filtration systems and, in particular, to a disposable cartridge system having a manifold which cooperates with the cartridge to interrupt the supply and return lines during cartridge changes to prevent drainage from the supply system.

A particular problem experienced with the changing of single appliance water purification/filtration cartridges is the necessity of dealing with drainage released from the supply and return lines with the release of the cartridge from a system manifold. Unless shutoff valves are provided in the system supply lines that mate to the manifold, water typically drains from one or both of the conduits with the removal of the cartridge from the manifold. The sporadic frequency of the cartridge changes and attendant operator forgetfulness to the problem typically results in drainage. That is, the maintenance personnel forget to mount a catch pan or other spill prevention appliance beneath the manifold and it becomes necessary to clean up the spill.

A number of cartridge systems which are subject to the foregoing problem are disclosed at U.S. Pat. Nos. 3,746,171; 4,515,692; 4,915,831; 4,877,521; and 5,354,464. The cartridges of the disclosed systems variously provide projecting bayonet return ports which mate with recessed outflow cavities at the manifold. Twist lock mountings to the manifold are also provided at some of the cartridges. Cartridge interlock retainers are also disclosed. However, flow control valving is not provided at either the manifold or cartridge for any of the foregoing systems. Nor do any of the cartridges include surfaces which cooperate with associated valving.

In appreciation of the foregoing problem and inconvenience, the present manifold and cartridge system was developed. In contrast to conventional cartridges, the manifold of the invention provides a bayonet fitting at a center out flow port which couples to a recess at the cartridge. Seals displaced along the fitting and internal to the cartridge contain viral contaminants to the cartridge. A spring biased stem valve at the manifold inlet port cooperates with a raised, tapered surface at the cartridge to permit flow only upon the rotational seating and locking of the cartridge to the manifold. A one-way check valve at the outlet port to prevents back flow. In an alternative construction, a slotted or split stem, check valve provides noise free operation. The system finds particular advantage with cartridge based appliance systems, such as ice makers and chilled water dispensers at a refrigerator or water cooler, and for under cabinet cartridge mountings, such as at sinks.

SUMMARY OF THE INVENTION

It is therefore a primary object of the invention to provide a cartridge based water purification and filtration system that prevents drainage from the supply and return lines upon removing a treatment cartridge.

It is a further object of the invention to provide a supply manifold containing shut off valves at one or both of provided supply and return ports.

It is a further object of the invention to provide a manifold having a stem valve at a supply port which cooperates with a surface at the treatment cartridge, such that with cartridge mounting and rotation or removal the valve retracts and extends to control supply flow.

It is a further object of the invention to provide a manifold having a projecting surface or bayonet fitting which contains a number of O'ring seals and which fitting mounts to a mating outlet recess at the cartridge which is backed by additional seals at the cartridge to prevent bypass migration of contaminants.

It is a further object of the invention to provide a manifold having channel ways which interlock to flanged shoulders at the cartridge, upon rotation of the flanges into the channelways.

It is a further object of the invention to provide a cartridge container having an infeed flow cavity defined between a sealed external housing and internal liner whereby flow is directed to the bottom of the cartridge and thence through filtration and purification treatment media supported in the liner and to the outlet port.

Various of the foregoing objects, advantages and distinctions of the invention are obtained in a presently preferred system which provides a manifold having integral flow control valves at inlet and outlet ports. The valves cooperate with a treatment cartridge to prevent drainage of liquid from the manifold supply lines during the changing of a treatment cartridge. Extraneous shut-offs are thereby avoided at the primary supply system.

The manifold is molded to provide a central tubular out flow or "bayonet" fitting. O'ring seals are fitted to the fitting to mate with a recessed port at the treatment cartridge to seal out flow from the cartridge. Radially displaced from the bayonet fitting are a number of channelways which interlock with shoulders of a mounted cartridge.

Depending from the manifold is a stem valve which controls flow from the inlet port. Raised surfaces at the cartridge contact the valve with the seating and rotation of the cartridge to the channelways. Supply flow is thereby enabled and disabled with a corresponding extension and retraction of the valve.

The treatment cartridge provides an open ended housing which supports a concentrically mounted internal liner. Radial flanges at the liner displace the liner from the housing and form an infeed channel. Flow is re-directed from a cartridge end cap. Successive stages of filtration and purification media treat the water prior to directing the water through a central recess which mates to the bayonet fitting.

A one-way check valve at the manifold outlet port permits liquid out flow but prevents back flow. A tapered valve stem is normally biased to a closed condition at the manifold to mate with a seat surface and opens upon liquid outflow being directed against the valve stem. In another construction, the valve includes a split, cylindrical stem and is constructed to provide surfaces that promote non-symmetrical flow to prevent valve oscillation and nuisance audible sounds.

Also disclosed is a dual cartridge manifold. Interconnected, manifolds support a filter cartridge and a purification cartridge.

Still other objects, advantages and distinctions of the invention are discussed below in relation to the appended drawings. To the extent various modifications and improvements have been considered, they are described as appropriate. The description should not be literally construed in limitation of the scope of the invention, which rather should be interpreted to include all those equivalent embodiments within the scope of the further appended claims.

DESCRIPTION OF THE PREFERRED EMBODIMENT

Figure 1:
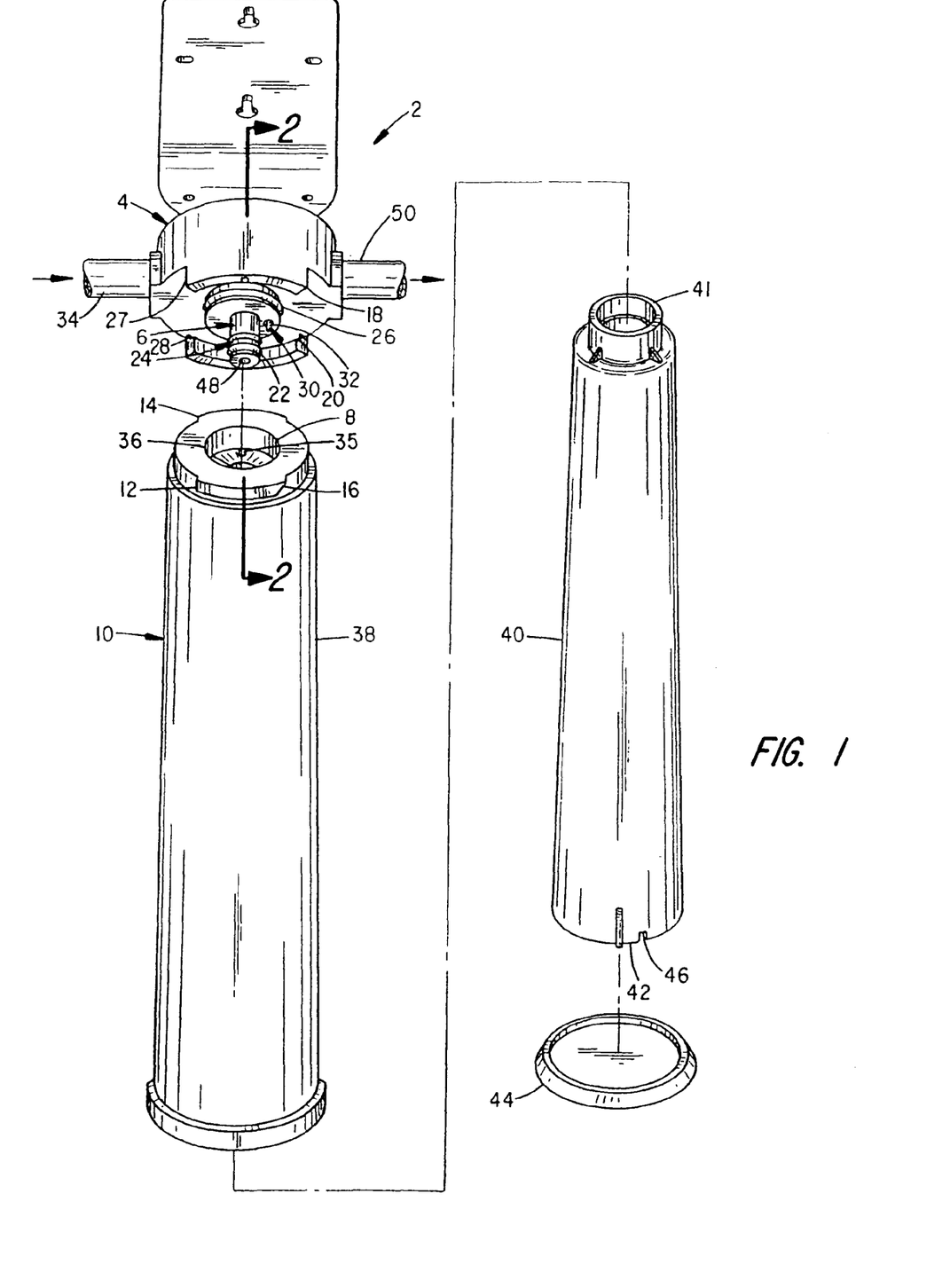
FIG. 1 is a perspective drawing to the manifold and treatment cartridge of the invention.

With attention to FIG. 1, an exploded assembly drawing is shown to the improved purification and filtration treatment system of the invention. The system 2 includes a supply manifold 4 having a sealed bayonet fitting 6 which mounts to a two stage recess 8 at a treatment cartridge 10. Radially displaced from the recess 8 are a pair of shoulder flanges 12, 14, which have tapered leading edges 16, that mate with a pair of interlocking flanges 18 and 20 at the manifold 4. With the mounting of the bayonet 6 into the recess B and the sealing of a number of O'rings 22, 24 and 26 mounted along the fitting 6 within the stages of the recess 8, the flanges 12, 14 are aligned to channelways 27 and 28 at the flanges 18 and 20. The cartridge 10 can then be rotated to interlock with the manifold 4, which concurrently permits flow between the manifold 4 and the cartridge 10.

Depending from one side of the bayonet fitting 6 is a stem valve assembly 30. The valve assembly 30 is configured to prevent flow through an adjoining aperture 32 that communicates with a supply conduit 34, except when the cartridge 10 is fully seated to the manifold 4. With the depression of the valve assembly 30, liquid flow is directed from the supply conduit 34 through the aperture 32 and a number of inlet ports 35 arrayed about the first stage 36 of the recess 8. Liquid flow is directed from the ports 35 through a cavity 37 formed between a cartridge housing 38 and an internal liner 40.

Figure 2:
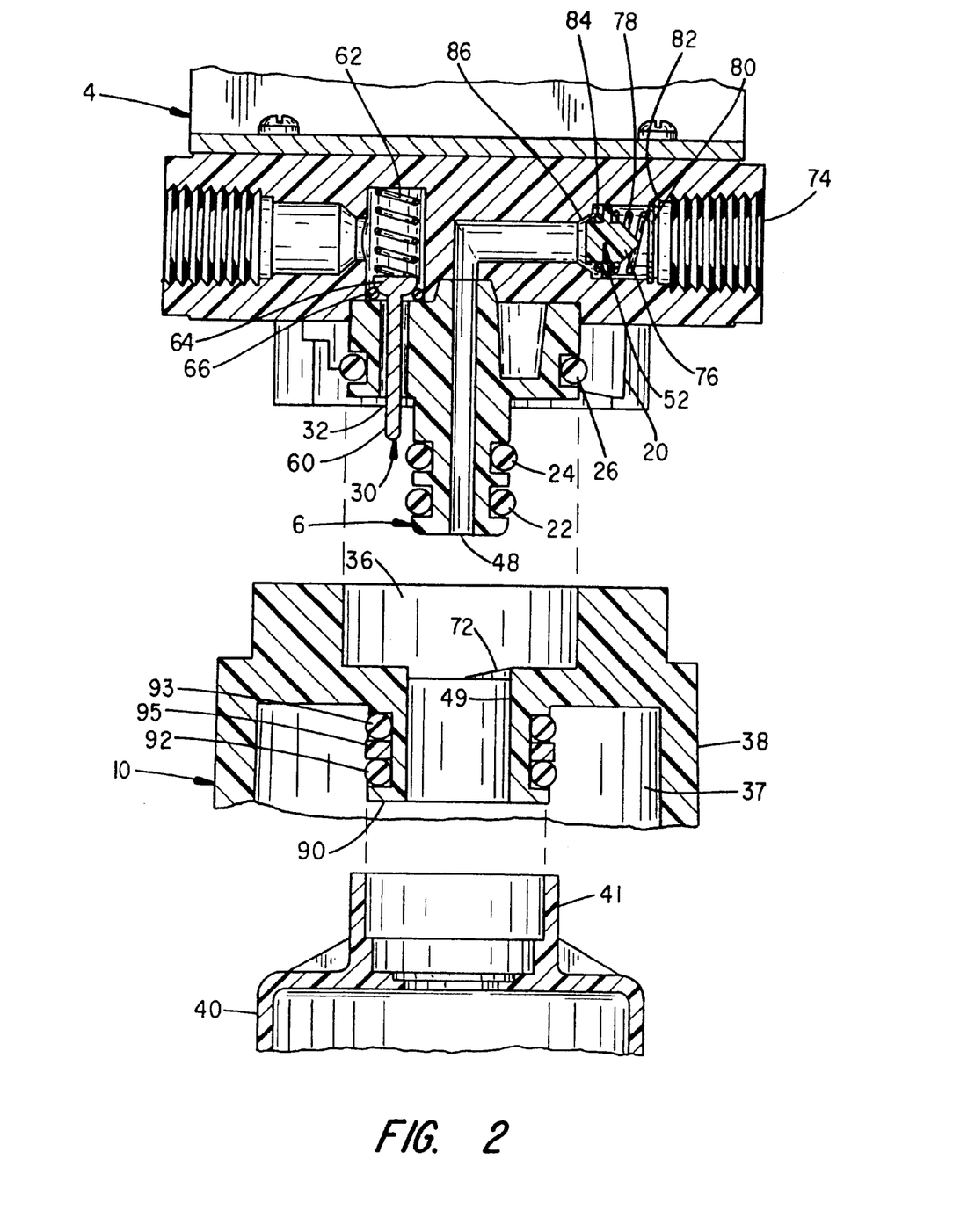
FIG. 2 is a partial cross section view through the manifold taken along section lines 2—2 at the longitudinal center of the manifold and cartridge.

The flow cavity 37 is particularly formed upon seating a number of radial spacers 42 at the liner 40 to the inner walls of the cartridge housing 38, reference FIG. 2. Flow is interrupted and re-directed at the base of the cartridge 10 by an end cap 44 that is spun welded to the housing 38. The flow is directed to the core of the liner 40 through a number of ports 46 arrayed about the lower periphery of the liner 40.

Figure 3:
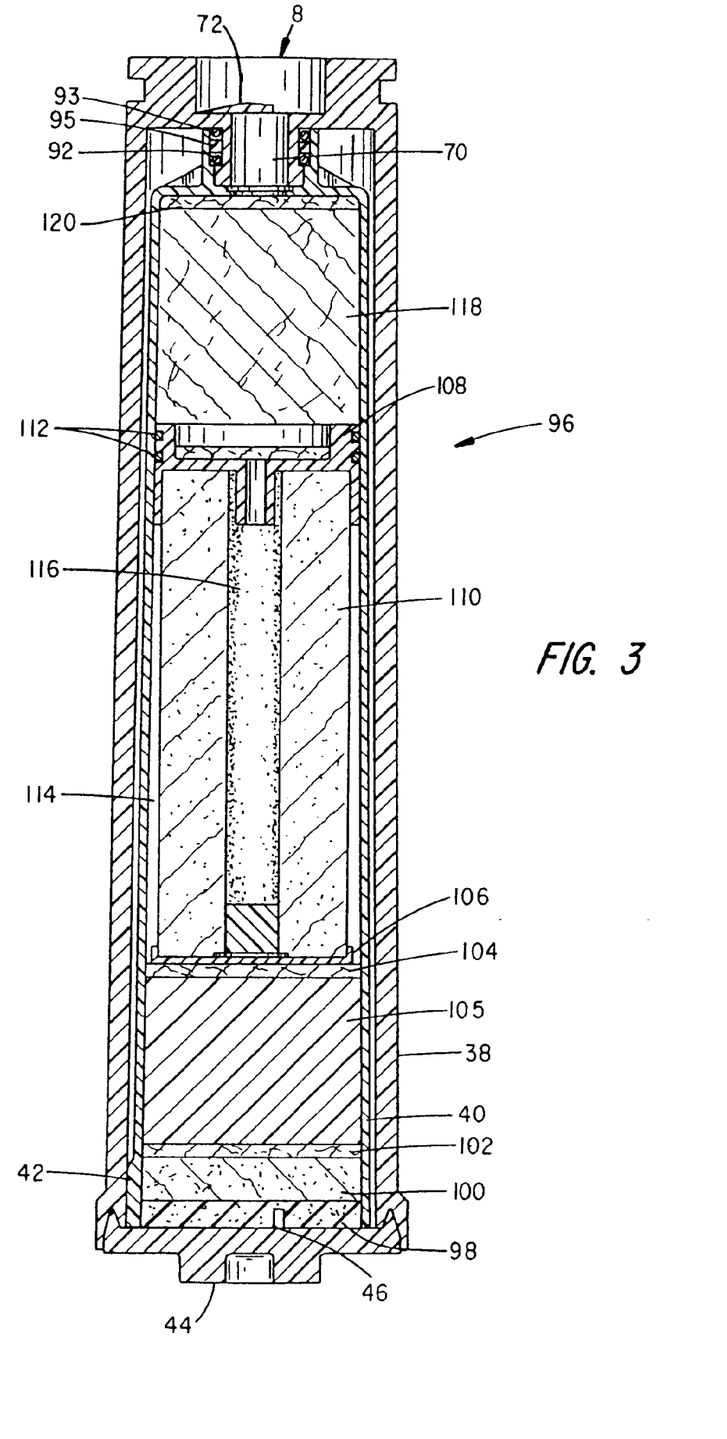
FIG. 3 is a longitudinal cross section view through the center of a treatment cartridge.
Figure 4:
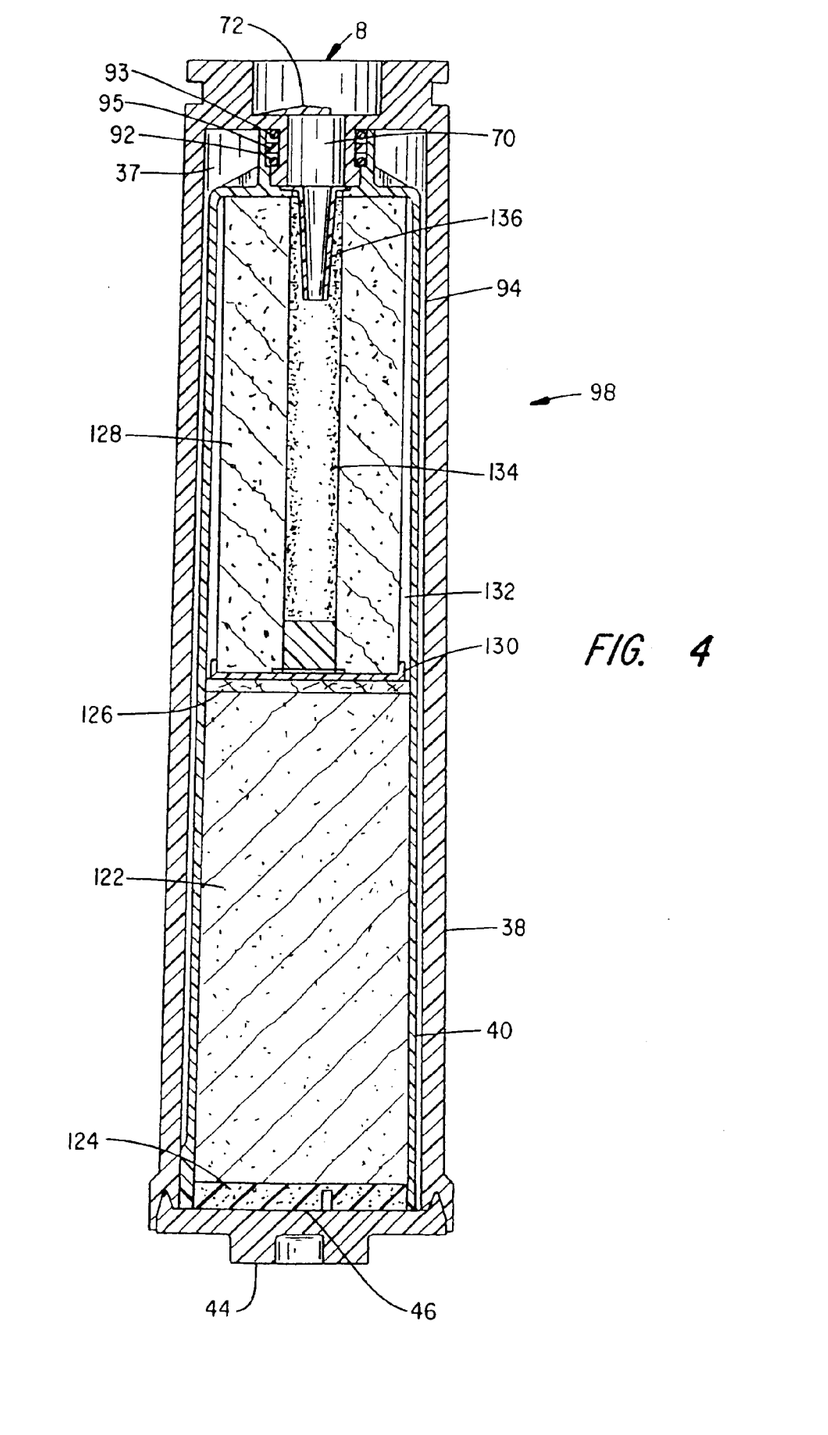
FIG. 4 is a cross section view through the center of an alternative treatment cartridge.
Figure 5:
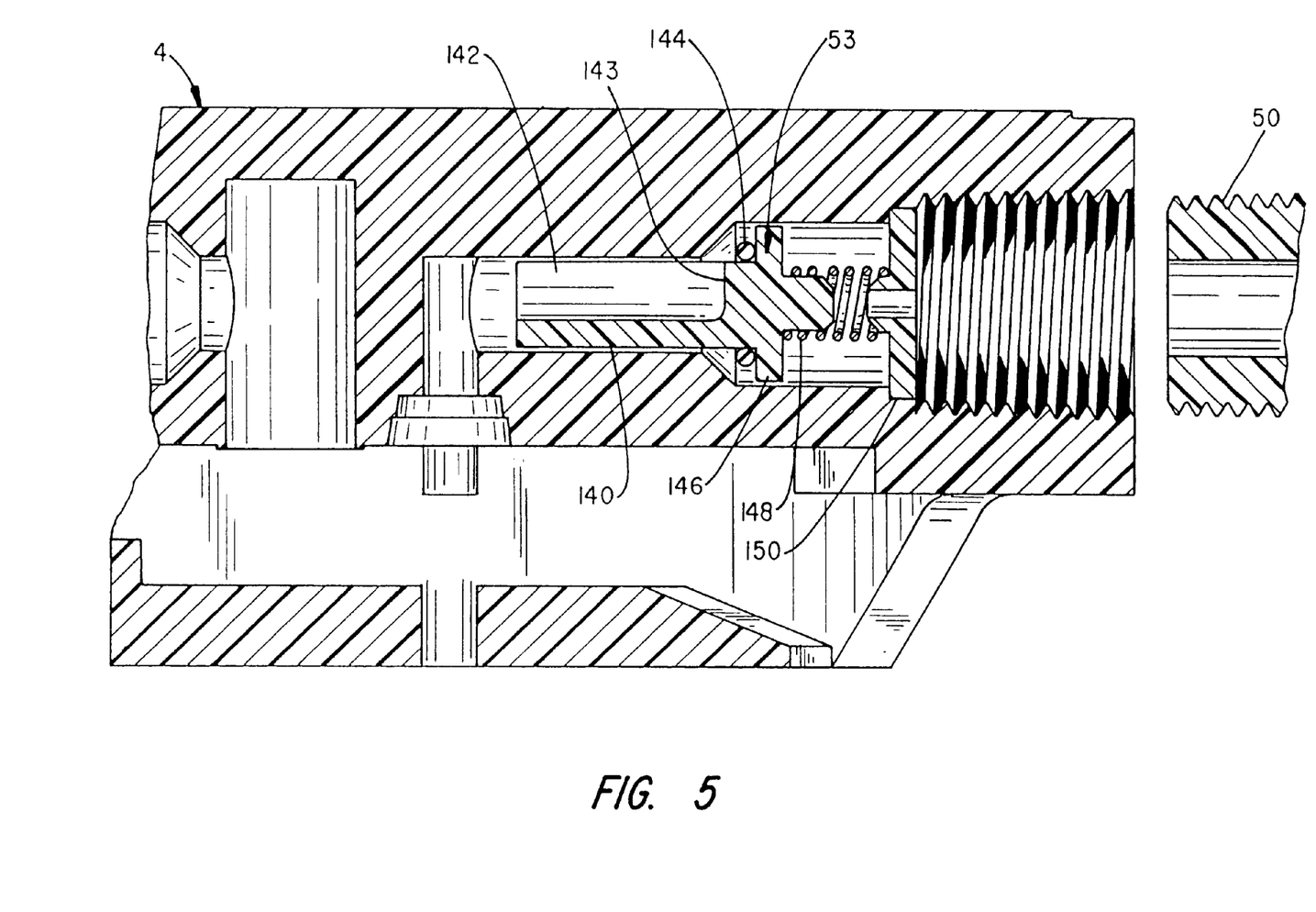
FIG. 5 is a plan view to a slotted stem check valve.
Figure 6:
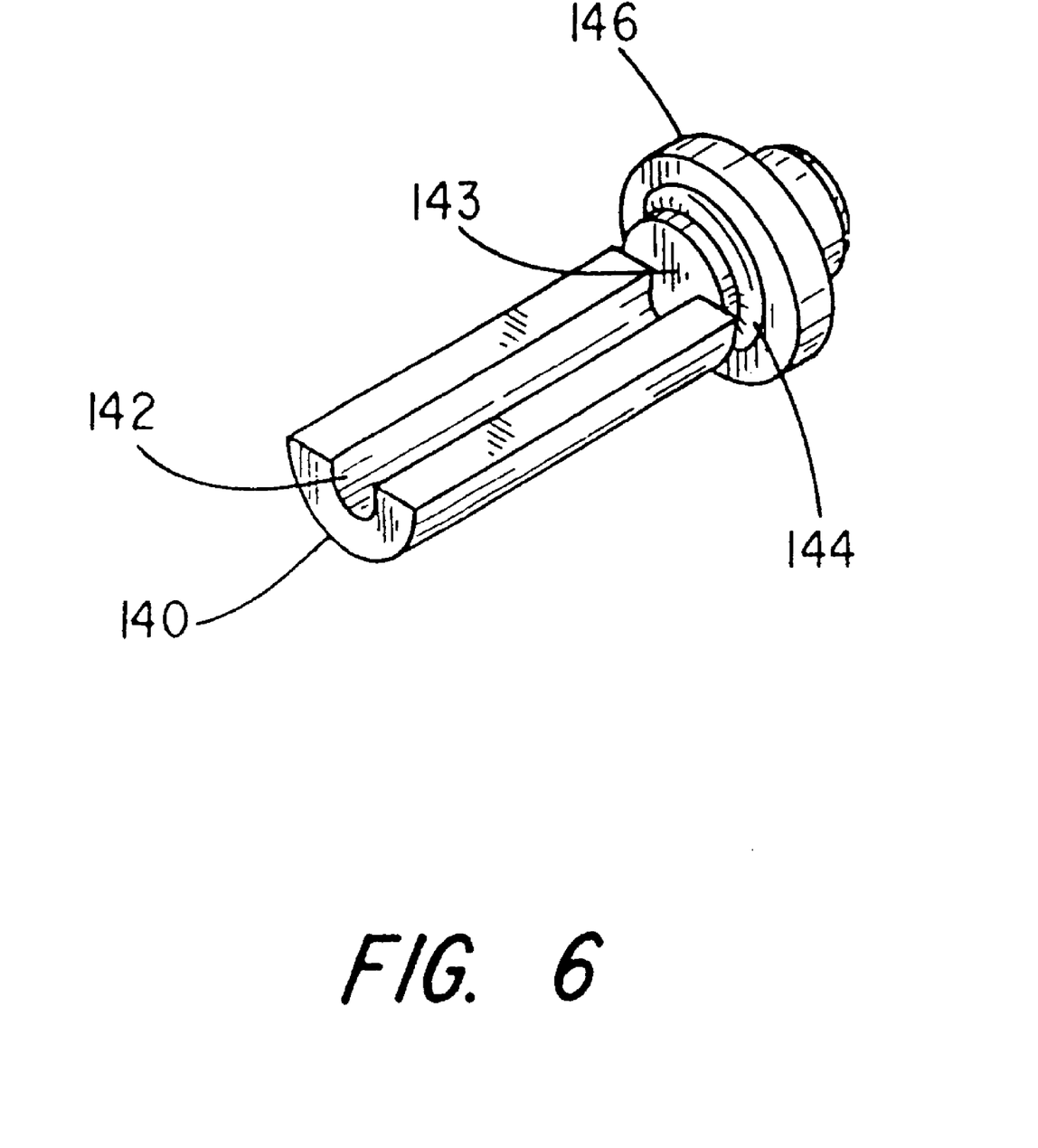
FIG. 6 is a perspective view of the valve stem of FIG. 5.
Figure 7:
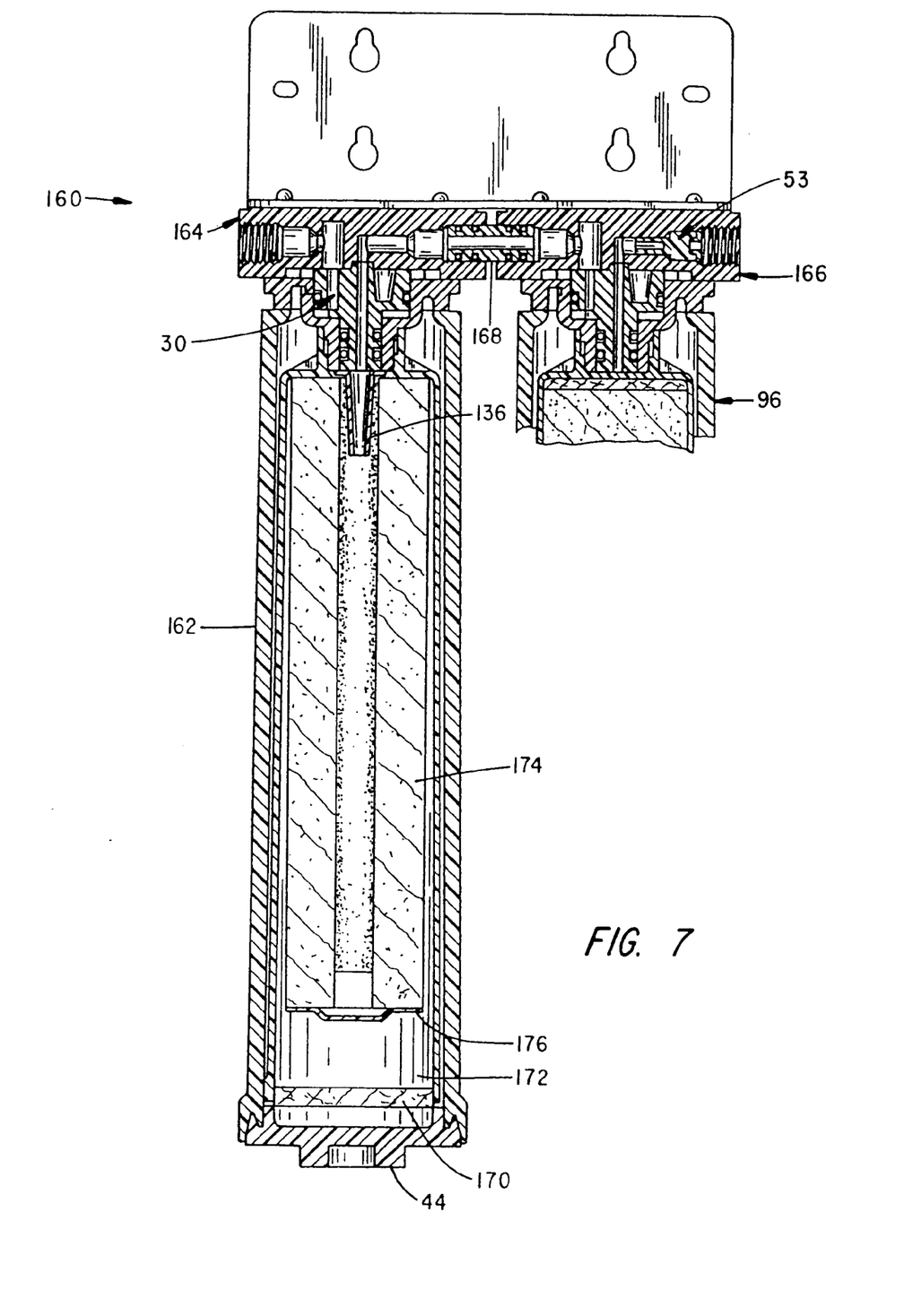
FIG. 7 is a longitudinal cross section view through a dual cartridge manifold assembly.

With the entry of liquid to the liner core, the liquid passes through a number of filtration and purification stages. Two alternative arrangements of which stages are shown at FIGS. 3 and 4. The filtered and purified water is directed from the liner 40 to a bore or flow aperture 48 of the bayonet fitting 6, which is exposed at the second stage 49 of the cartridge recess 8. Flow is directed through the bayonet fitting 6 to an outlet conduit 50 via an intermediate check valve assembly 52 shown at FIG. 2. FIGS. 5 through 7 depict another and presently preferred check valve assembly 53 which assembly 53 is discussed below.

The check valves 52 and 53 are constructed to provide noise free operation under flow pressures in the range of 10 to 125 psi. It has been found that various conventional check valves can produce nuisance sounds. Such noises are preferrably avoided in confined spaces, such as a refrigerator.

A particular advantage obtained from the system 2 is the ability to automatically interrupt flow from the supply and return conduits 34, 50 upon disconnecting a cartridge 10 from the manifold 4. Nuisance drainage is thereby prevented upon removing the cartridge 10 from the manifold 4. Standing water within the cartridge 10, downstream of the check valve 52, is retained in the cartridge 10 due to the recessed mounting of the bayonet fitting 6 into the cartridge 10.

The supporting of the bayonet fitting 6 and the appurtenant O'rings 22, 24 and 26 to the two stage recess 8 simplifies the construction of the cartridge 10 versus the conventional cartridges mentioned above. The latter cartridges provide a sealed bayonet fitting at each cartridge which mate to a recess at the manifold. A large number of relatively costly O'ring seals are thus required to accommodate the disposable cartridges. The system 2 avoids the cost by mounting the seals to the manifold 4. Other seals 92, 93, which are discussed below, are instead included to prevent viral contaminants from bypassing the treatment media. A more cost effective and efficient filtration and purification system is thereby obtained.

Turning attention to FIG. 2, a longitudinal cross section view is shown through the manifold 4 and from which details to the fitting of the cartridge 10 to the bayonet fitting 6 and the reasons for the commensurate lack of drainage with the removal of the cartridge 10 are more apparent. Particularly apparent are the construction of the valve assemblies 30 and 52 and the cooperation of the cartridge housing 38 with a stem valve 60 of the valve assembly 30.

With attention to the valve assembly 30, the stem valve 60 is fitted to the manifold 4 to protrude from the cutlet aperture 32. A normally closed valve condition is obtained with a spring 62 which forces a valve seat 64 at the aft end of the stem valve 60 into engagement with an O'ring seal 66 at the manifold 4 to prevent flow through the aperture 32. Internal surfaces of the manifold 4 adjacent the seat 64 might also be shaped to mate with the seat 64 in lieu of or in combination with the O'ring 66.

Projecting from the first of the 2 stages 36, 49 at the recess 8 is a raised, tapered projection 72 that engages the stem valve 60 with the fitting and the rotation of the cartridge 10 to the manifold 4, reference also FIGS. 3 and 4. The mounting of the flanges 14, 16 and 18, 20 are such that the projection 72 does not engage the valve stem 60 until the shouldered flanges 12 and 14 are fully seated and rotated into the channelways 27, 28 to lock to the manifold 4. A gradual depression of the stem valve 60 is thereby assured.

Captured to the manifold 4 adjacent an outlet port 74 that contains the outlet conduit 50 is the outlet valve assembly 52. The valve assembly 52 includes a valve body 76 which is resiliently supported between a spring 78 and a retainer 80. The retainer 80 presently comprises a ring which is retained to a grooved surface 82. The spring 78 biases an O'ring 84 fitted to the valve stem 76 to seal to a tapered surface or seat 86 of the manifold 4. The elastomer material of the O'ring 86 enhances the seal and reduces noise due to valve operation.

The valve assembly 52 particularly prevents audible clicking sounds at the manifold 4. Such sounds can present a nuisance where the system 2 is used with home appliances, such as refrigerators, cooling fountains, faucets, or other applications where the system 2 is confined within a living space. A variety of commercially available check valve assemblies have been tested but found to be inadequate.

FIG. 5, which is discussed below, discloses another and presently preferred check valve assembly 53.

Also shown at FIG. 2 is the mounting of the liner 30 to the cartridge housing 38. Particularly apparent is the manner of the mounting of a collar 41 at the liner 30 to a housing projection 90 and a pair of O'rings 92 and 93, which are separated by a spacer ring 95. The multiple sets of O'rings 22, 24 and 26 and 92, 93 and spacer ring 95 not only contain the flow from the cartridge 10 to the fitting 6 but also provide a seal against undesired back bypass migration of viral contaminants.

With the fitting of the liner 40 to the housing 38, the flow channel 37 is created at the outer periphery of the liner 40 and which is more apparent at the cartridges 96 and 98 of FIGS. 3 and 4. Liquid flow is contained between the channel 37 and the bore 49 and contaminants are restrained to the cartridge 10.

With attention to FIG. 3 and mounted within the core of the liner 40 are a number of seriatim stages of filtration and purification media which are arranged to provide the most advantageous dwell time and exposure of the water to the treatment media. With the entry of the water to the liner core at the apertures 46, the water is initially exposed to a pair of circular discs of filter media 98 and 102, which are mounted to contain a bed of granular activated carbon (GAC) 100. The filter media 98, 100 and 102 filter large particulates and organisms from the water. Positioned between the disc filter 102 and another disc filter 104 is a bed of granular bactericide 105 such as a multi-valent iodine resin 106 that can be present in a concentration in the range of 40 to 400 cubic centimeters. Presently, a bed of 80 cc's of a PENTAPURE material is used at the bactericide 105.

Supported above the disc filter 104 are a pair of porous plastic spacers 106 and 108 and which capture a cast cylindrical carbon filter 110 to the liner 40. The filter 110 is constructed of a cast GAC material and exhibits a nominal porosity in the range of 0.5 to 20 microns. Depending upon the application, a pleated cylinder paper filter media might be substituted at the filter 110.

O'ring seals 112 at the spacer 108 contain and direct water flow from a channel space 114 at the outer periphery of the filter 110 inward to a bore 116. The water flows from the bore 116, through the spacer 108 into a second bed of purification media 118 containing a mixture of halogen bactericides, GAC and/or halogen scavenger media. From the media 118, the water passes through a further disc filter 120 to the cartridge outlet bore 49 and the outlet port 48 of the manifold 4.

Depending upon the application and the particular contaminants found in the available water supply, the arrangement of the treatment media and the types of media can be varied to provide either filtration or purification or both. FIG. 4 discloses an alternative treatment cartridge 98 that is intended to principally serve as a filter. The cartridge 98 contains a bed of GAC media 122 between a pair of porous disc filters 124 and 126. The space containing the media 122 might also be subdivided to contain another filter media, such as a paper filter or the like.

Mounted above the media 122 is a solid cylindrical block of GAC media 128 which is supported to a porous plastic retainer 130. The filter 128 is constructed of a cast GAC media and exhibits a nominal porosity in the range of 0.5 to 20 microns. Liquid flow is directed from a channel space 132 between the liner 40 and filter 128 inwardly to a bore 134. supported within the bore 134 between the manifold 4 and the outlet bore 49 is a porous conical nozzle 136 which directs flow to the outlet bore 49 and seals to the fitting 6.

With attention to FIGS. 5 and 6, enlarged cross section and perspective views are shown to the above mentioned alternative check valve assembly 53. The assembly 53 provides a cylindrical valve stem 140 that includes a longitudinal slot 142 that extends along a sidewall of the valve stem 140 to direct flow along the slot 142 to a surface 143 adjacent an O'ring seal 144. Flow is directed in a non-symmetric fashion such that greater pressure is exerted against the surface 143 which provides a slight tipping of the valve stem 140. This tipping has been found to reduce the tendency of audible clicking sounds at the manifold 4.

The seal 144 is fitted forward of a shoulder 146 to conform and seal the juncture between the shoulder 146 and the manifold 4. A spring 148 and retainer 150 bias the shoulder 146 and seal 144 to prevent back flow at the valve 53. The retainer 150 is press fit to the body of the manifold 4 and is also secured with the fitted conduit 50.

Appreciating the potential of encountering water supply systems containing many large contaminants, such as well systems, FIG. 7 depicts a treatment system 160 that supports a pair of cartridges 96 and 162 from a pair of interconnected manifolds 164 and 166. The manifolds 164 and 166 are interconnected by an O'ring sealed coupler 168. The manifold 164 is fitted with a valve assembly 30 and the manifold 166 is fitted with a check valve assembly 53. Nuisance drainage is thus prevented with the changing of either of the cartridges 162 and/or 96.

The arrangement of the cartridges 96, 162 are such that the cartridge 162 principally filters the water and the cartridge 96 purifies the water. The assemblies of the cartridges 162 and 96 are essentially the same as earlier described. The principal difference is that the liner of the cartridge 162 is fitted with a disc filter 170, a bed of GAC pre-filter media 172, and a cast cylindrical GAC filter 174. The filter 174 is fitted between a disc end cap 176 and the conical nozzle seal 136. Depending again upon the application, the filter treatments can be varied, such as by including paper filter media and/or varying the volume and porosity of the filtration medias.

While the invention has been described with respect to a presently preferred construction of the manifold and alternative cartridge constructions, still other constructions may be suggested to those skilled in the art. The following appended claims accordingly should be interpreted to include all those equivalent embodiments within the spirit and scope thereof.

What is claimed is:

1. A treatment system for receiving a flow of fluid from a source for treatment and for discharging a flow of treated fluid, comprising:

(a) a manifold having a manifold inlet port and a manifold outlet port, a shut off valve being disposed for fluidly sealing at least one of said ports, the inlet port being operably fluidly coupled to the fluid source for receiving the flow of fluid to be treated therefrom, the manifold inlet port being fluidly coupled to a flow inlet channel defined in the manifold, the outlet port being fluidly coupled to a flow outlet channel defined in the manifold, the flow inlet channel having a discharge opening for discharging the fluid conveyed therein, the discharge opening being defined in a lower margin of a depending inlet boss, the inlet boss having a circular cross-section defined about a longitudinal axis and presenting an inlet boss circumferential outer margin, the discharge opening being radially displaced from the longitudinal axis, boss sealing means being disposed in a sealing relationship with the boss circumferential outer margin, an outlet cylindrical projection depending from the inlet boss and having a circular cross-section defined about the boss longitudinal axis and presenting a circumferential outer margin, an outlet opening being coincident with the inlet boss longitudinal axis and being fluidly coupled to the flow outlet channel, outlet seal means being disposed in a sealing relationship with the outlet projection circumferential outer margin, a flow outlet channel fluidly coupling the outlet opening to the manifold outlet port, at least one annular manifold interlocking member being disposed radially outward of the inlet boss, (b) a replaceable cartridge having an inlet annular recess defined about a cartridge longitudinal axis, the inlet annular recess presenting first mating surfaces including an annular outer wall and having a circular bottom margin, at least one inlet port being defined in the circular bottom margin displaced from the cartridge longitudinal axis, an outlet annular recess defined about the cartridge longitudinal axis, the outlet annular recess depending from the inlet annular recess circular bottom margin and presenting second mating surfaces including an annular outer wall and having a circular bottom margin, at least one outlet port being defined in the circular bottom margin coincident with the cartridge longitudinal axis, at least one annular cartridge interlocking member being disposed radially outward of the inlet annular recess, the first mating surfaces and the second mating surfaces being substantially continuous and free of sealing means.

2. The treatment system of claim 1 wherein the boss sealing means are an O-ring and the outlet sealing means are at least one O-ring.

3. The treatment system of claim 1 including an inlet shut off valve being disposed in the manifold inlet ports, the shutoff valve being biased in a closed disposition.

4. The treatment system of claim 3 wherein the inlet shutoff valve is mechanically actuated.

5. The treatment system of claim 4 wherein the inlet shutoff valve is shifted from a closed disposition to an open disposition by interlocking engagement of the replaceable cartridge and the manifold.

6. The treatment system of claim 3 wherein an outlet shutoff valve is disposed in the manifold outlet port.

7. The treatment system of claim 6 wherein the outlet shutoff valve is a fluid flow actuated valve, fluid discharge flow from the manifold acting to open the outlet shutoff valve.

8. The treatment system of claim 6 wherein the outlet shutoff valve is a mechanically actuated valve.

9. The treatment system of claim 1 wherein the outlet sealing means comprise a plurality of O-ring seals to define a plurality of cooperative sealing barriers between the untreated fluid and the treated fluid.

10. A coupling system for coupling a treatment cartridge to a manifold, the coupling system comprising:

a coupler being couplable to the manifold and being operably couplable to the treatment cartridge and having;

a coupler inlet annular recess defined about a coupler longitudinal axis, the coupler inlet annular recess presenting an annular outer wall and having a circular bottom margin, at least one inlet port being defined in the circular bottom margin displaced from the coupler longitudinal axis, a coupler outlet annular recess defined about the coupler longitudinal axis, the coupler outlet annular recess depending from the coupler inlet annular recess circular bottom margin and presenting a coupler annular outer wall and having a circular bottom margin, at least one outlet port being defined in the circular bottom margin coincident with the coupler longitudinal axis;

at least one annular coupler interlocking member being disposed radially outward of the coupler inlet annular recess; and the coupler presenting a plurality of mating surfaces for sealingly mating to the manifold, the plurality of mating surfaces being substantially continuous and free of sealing means.

11. The coupling system of claim 10 whereby insertion of a manifold inlet boss and a manifold outlet projection into the coupler inlet annular recess and the coupler outlet annular recess, respectively, acting to define a fluid seal between a boss sealing means and the coupler inlet annular recess outer wall and acting to define a fluid seal between an at least one outlet sealing means and the coupler outlet annular recess outer wall, rotation of the coupler with respect to the manifold acting to cooperatively engage the at least one annular manifold interlocking member with the annular coupler interlocking member defining a flow path between the manifold discharge opening and the coupler inlet port and fluidly coupling the coupler outlet port and the manifold outlet opening.

12. The coupling system of claim 10 where the coupler is fixedly coupled to the treatment cartridge, forming a unitary structural cartridge component therewith.

13. The coupling system of claim 10, the coupler being a flow interface for selective coupling of a treatment cartridge open ended cartridge housing to the manifold, the cartridge housing having treatment media disposed therein.

14. A coupling system for coupling a treatment cartridge to a filter apparatus manifold, the manifold having a flow inlet and a flow outlet, the filter apparatus manifold and the treatment cartridge comprising a filter apparatus when the treatment cartridge is brought into operable engagement with the filter apparatus manifold, comprising:

inlet/outlet means being a two stage recess, the recess having a first cylindrical stage having a first stage diameter and having a first end and an opposed second end, an opening being defined at a first end thereof, the recess further having a second substantially cylindrical stage being concentric with the first cylindrical stage and having a second stage diameter and having a first end and an opposed second end, the second stage diameter being less than the first stage diameter and having a first end operably coupled to the second end of the first cylindrical stage by a connecting wall and having an opening being defined at the second end thereof, the first cylindrical stage being in flow communication with the flow channel by at least one inlet port being defined between said first cylindrical stage and said flow channel and the second cylindrical stage being fluidly communicable with the treatment cartridge, at least two shoulder flanges being radially disposed with respect to the inlet/outlet means, the shoulder flanges having a tapered leading edge, the first cylindrical stage presenting a first mating surface for mating with the filter apparatus manifold and the second substantially cylindrical stage presenting a second mating surface for mating with the filter apparatus manifold, the first and second mating surfaces being substantially continuous and free of interruption by fluid seals.

15. The coupling system of claim 14 wherein the inlet/outlet means includes a flow inlet and a flow outlet, the flow inlet being at least one bore intersecting the recess first cylindrical stage and depending therefrom to define a depending flow passageway, the flow outlet being defined by the recess second cylindrical stage, the recess second cylindrical stage forming a flow passageway fluidly communicable with the treatment cartridge.

16. The coupling system of claim 14, the coupling system being fixedly coupled to the treatment cartridge, forming a unitary structural cartridge component therewith.

* * * * *